United States Patent Office 3,349,395
Patented Oct. 24, 1967

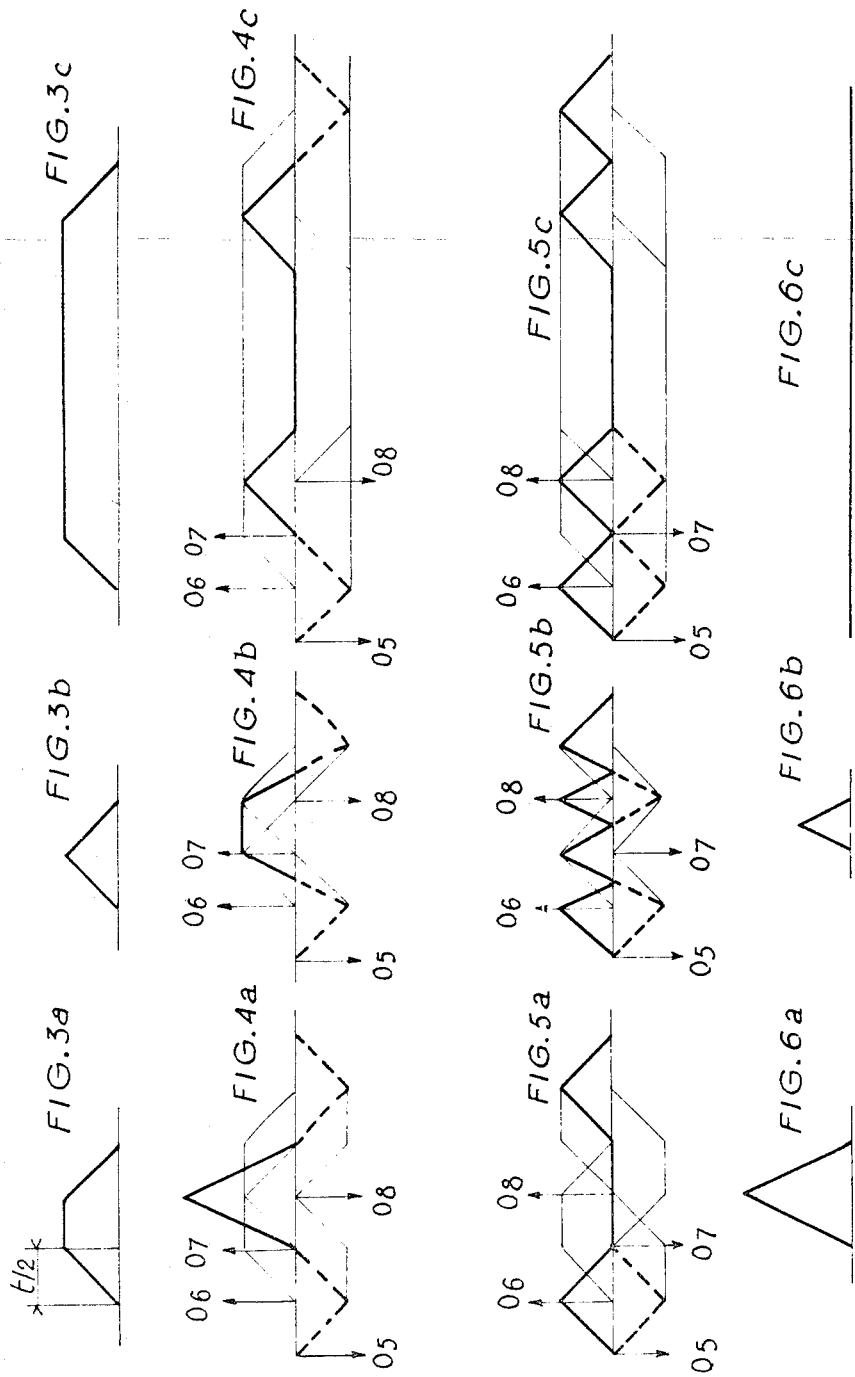

3,349,395
SYSTEM FOR ELIMINATING LONG ECHOES FROM RADAR SIGNALS AND SHAPING THESE SIGNALS
Roland Carré and Jean Robert, Paris, France, assignors to CSF—Compagnie Generale de Telegraphie Sans Fil, a corporation of France
Filed Aug. 19, 1965, Ser. No. 480,853
Claims priority, application France, Aug. 28, 1964, 986,495
18 Claims. (Cl. 343—17.1)

ABSTRACT OF THE DISCLOSURE

A system for eliminating long echoes from radar signals, and shaping these signals. The signals are applied to a delay line with many outputs from which different sums of the received echoes are derived. Through different subtracting of the sums from each other and the detection thereof, the desired signals are obtained.

The present invention relates to electromagnetic detection systems. More particularly, the invention relates to a new system for the treatment of video-frequency information delivered by the conventional receivers of radar systems.

In certain radar stations, the video-frequency signals delivered by the radar receiver have to be transformed into rectangular signals of constant level, after having been cleared from long parasitic echoes and bottom clipped. The threshold level of the bottom clipping, which is determined by the maximum number of acceptable false alarms, has to be constantly regulated to ensure optimum exploitation of the information.

It is an object of the invention to provide a system which alone performs the above function, i.e. the preliminary elimination of long echoes and the adjustment of the bottom clipping threshold level, the clipping and the shaping of the signals.

The device according to the invention is based on the difference in the respective lengths of the echoes of a point target, a noise signal and a parasitic echo, the measurement of the false alarm being effected in a sliding window framing the echoes.

For a better understanding of the invention and to show how the same may be carried into effect, reference will be made to the drawing accompanying the following description in which.

Figure 1:
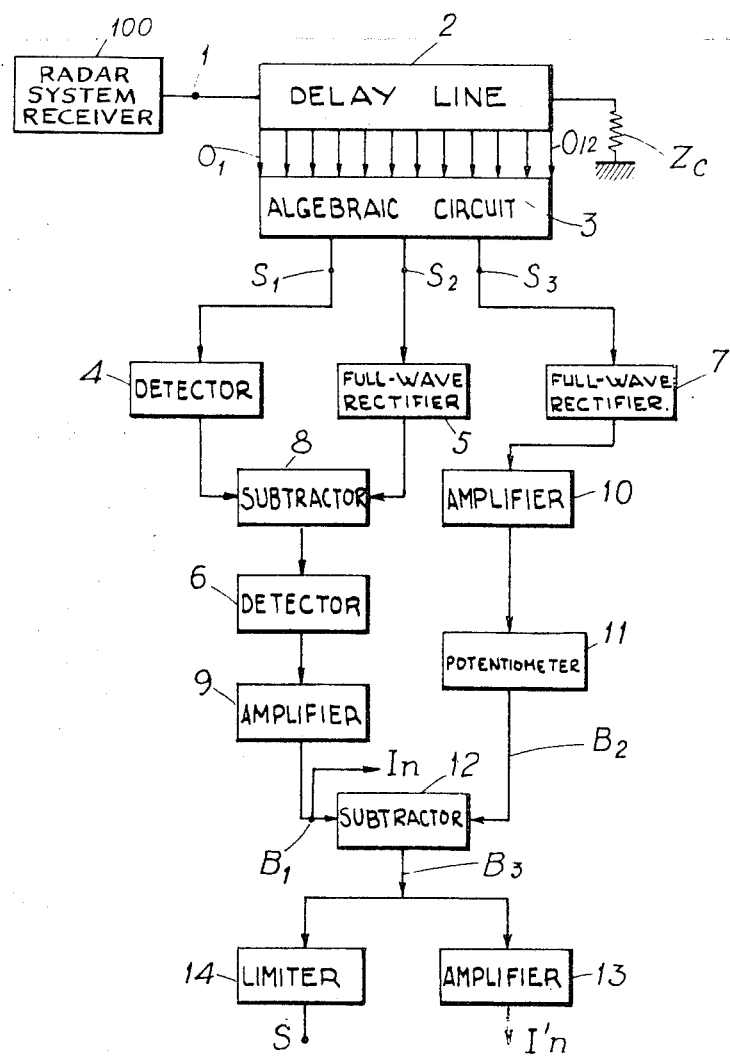
FIGURE 1 is a block diagram of a system according to the invention.
Figure 8:
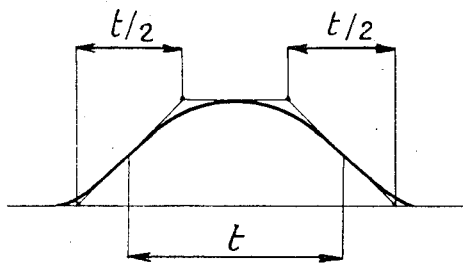

FIGURES 3 ($a$, $b$, $c$), 4 ($a$, $b$, $c$), 5 ($a$, $b$, $c$), 6 ($a$, $b$, $c$) and 7 are graphs showing the form of the various signals at different points of the circuit of FIGURE 1, and FIGURE 8 shows a "crude video" echo from a point target on a larger scale.

The system shown in FIGURE 1 will be described with reference to FIGURES 3 ($a$, $b$, $c$) to 6 ($a$, $b$, $c$), 7 and 8, with a view towards showing how this system permits various treatments of the video signal as detected, i.e. the elimination of parasitic echoes and bottom and peak clipping.

Figure 7:
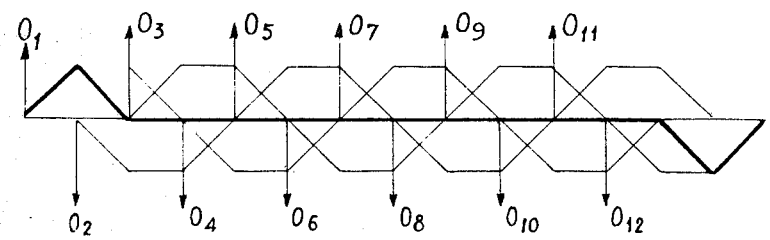

In FIGURES 3, 4 and 7, the fine lines represent the component signals and the arrows $01$ to $012$ the corresponding tappings of the delay line 2 shown in FIGURE 1.

In FIGURE 1, there is shown at 1 the video output of a conventional radar system receiver 100 i.e. the output of the detector stage. The transmission pulses duration is designated by $t$. This output is connected to one end of a delay line 2, the total delay of which is $5.5\ t$ at the video frequency of the received considered. The other end of the line is earthed through the characteristic impedance $Z_c$ of the line. In this example, the line 2 comprises twelve uniformly spaced tappings $01$ and $012$ (only the end tapping carry references for the sake of the clarity of the figure), that is to say, so spaced that the delay imposed on a video signal between two consecutive tappings is equal to $t/2$. These tappings feed in parallel a multiple algebraic adding circuit, 3, having twelve inputs, connected respectively to the outputs $01$, $02$ . . . $012$, and three outputs S1, S2 and S3.

The elimination of the long echoes is obtained by combination of the signals collected, for example, on the centre tappings $05$, $06$, $07$, $08$ of the line 2. In fact, the adding circuit 3 furnishes at its output S1 the algebraic sum $S1=(06+07)-(05+08)$ and at its output S2, the algebraic sum $S2=(05+07)-(06+08)$. For simplification, $01$ to $012$ and S1, S2, S3 denote the signals collected at the tappings carrying the same reference numbers.

The output S1 is connected to a detector 4, for example a diode detector, which suppresses the negative part of the signals. FIGURES 3$a$, 3$b$ and 3$c$ show, respectively, the video signals as applied to input 1 corresponding respectively to a point target, a short noise signal and a long signal (echo from a target of large dimension, considered as parasitic), and FIGURES 4$a$, 4$b$, 4$c$ show in heavy lines, respectively, the corresponding signals at the output of the detector 4. In these figures, the dash-line portions indicate the parts of the signal which have been suppressed by the detection. Furthermore, FIGURE 8 shows in detail the structure of the echo of FIGURE 3$a$, which comprises leading and trailing edges of duration $t/2$ and a half-height duration equal to $t$.

The output S2 is connected to a full-wave rectifier 5, which furnishes the signals shown in heavy lines in FIGURES 5$a$, 5$b$ and 5$c$ in response to the signals 3$a$, 3$b$, 3$c$, respectively. In these figures, the dash-lines indicate the negative parts of the signal at the output S2, that is to say, before rectification. The detector 4 and rectifier 5 are connected, respectively, to the two inputs of a subtraction device 8, which may be, for example, a differential amplifier, followed by a detector 6, which in response to the signals 3$a$, 3$b$ and 3$c$, furnishes the signals shown at 6$a$, 6$b$ and 6$c$, respectively.

It will be seen that the amplitude of the signal 6$a$, corresponding to a point target, is doubled, while that of signal 6$b$ is unchanged and the long signal 6$c$ has been eliminated.

The amplitude of a signal having a mean duration $t$, but with longer edges that those of the signal 3$a$, would be reduced. In other words, the non-linear filter formed by the elements 2, 3, 4, 5, 8 and 6 optimises the responses to the point targets. The signal collected at the output of detector 6 is a "purified" video signal, that is to say, a signal from which the parasitic signals have been eliminated (for example, long echoes) or attenuated (noise), and, after amplification in an amplifier 9, may feed a conventional radar indicator indicated by the arrow In in FIGURE 1.

Measurement of the mean noise level is obtained by effecting the algebraic sum of the signals collected at all the tappings by alternating the signs, i.e.

$(01+03+05+07+09+011)-$
$(02+04+06+08+010+012)$, which sum is furnished by the device 3 at its output S3 and rectified in the full-wave rectifier 7.

FIGURE 7 shows, in heavy lines, the sum corresponding to the input signal 3$a$; it will be seen that at the output S3 the echoes are eliminated except at the two ends;

the noise signals, on the contrary, furnish a bipolar function, which after rectification in the full wave rectifier 7, gives a voltage which is a measure of the noise level.

This voltage, after amplification in amplifier 10, is utilised for controlling the bottom clipping threshold level of the purified video signal obtained at the output of the amplifier 9 at the terminal B1. For this purpose, the output of the amplifier 10 is connected by means of a potentiometer 11, having an output terminal B2, to the first input of a subtracting device 12, the second input of which is connected to the amplifier 9. The potentiometer 11 is adjusted beforehand as a function of the false alarm, which is deemed acceptable.

At the output of the subtractor 12 there is collected at B3 a bottom clipped video signal which, after amplification in amplifier 13, may be utilised, as indicated by the arrow I'n, for feeding an indicator, for example a panoramic indicator; this bottom clipped video signal is clipped in a limiter amplifier 14, which furnishes at the terminal S the "prepared" video, that is to say, purified from long echoes, bottom clipped as a function of the level of the mean noise and limited, in other words, ready to be used in an automatic treatment device.

The elements 2 to 14 constitute a unit which may be fitted to the video output of any conventional radar system.

Figure 2:
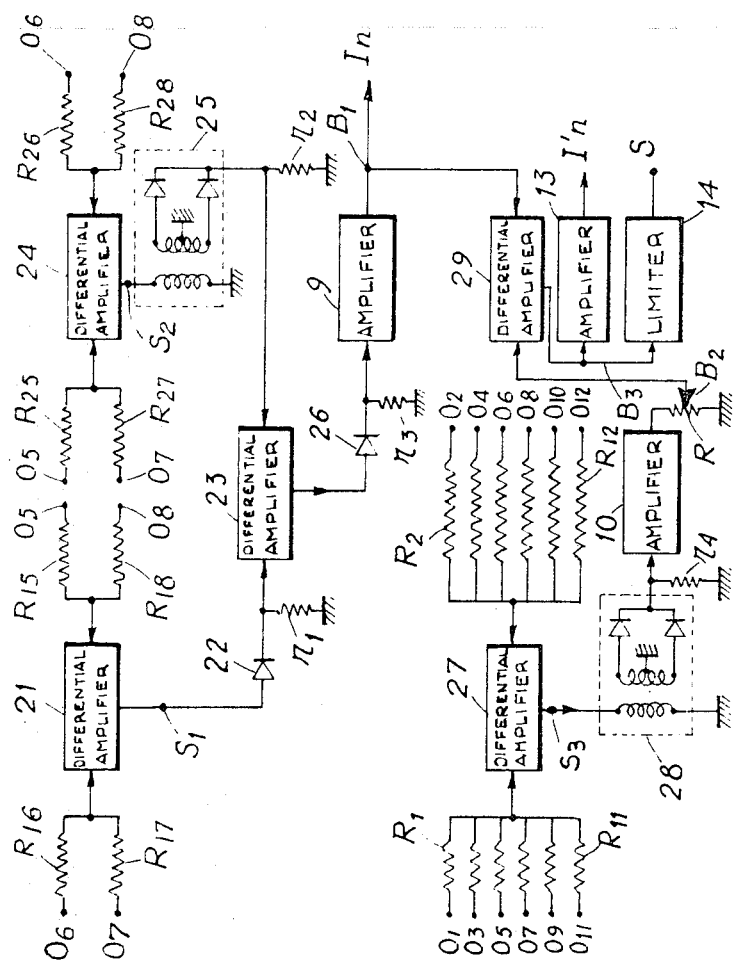
FIGURE 2 shows by way of example one embodiment of a part of the device of FIGURE 1.

FIGURE 2 shows a constructional example of the device for combining the signals 01 to 012 according to the invention, that is to say the whole of the multiple adder 3, and also the elements following the latter.

In this figure, some of the terminals $0i$ ($i=1$ to 12) have been shown at several points to facilitate comprehension, but it is to be understood that, in fact, the circuits concerned are connected in parallel to a single terminal. The notations 01 to 012 and S1, S2, C3 of FIGURE 1 have been retained in FIG. 2.

Resistances R16 and R17, on the one hand, and R15, R18 on the other, connect the terminals 06, 07 and 05, 08 to the inputs of a differential amplifier 21, the output S1 of which is connected by means of a diode 22 to one of the inputs of a differential amplifier 23. The terminals 05, 07 are connected to one input of a differential amplifier 24 by means of resistances R25 and R27 respectively and terminals 06 and 08 are connected to the other input of amplifier 24 through the resistances R26 and R28 respectively. The output S2 of the differential amplifier 24 is connected to the other input of the amplifier 23 through a transformer and full-wave rectifier unit, comprising in conventional manner two windings, the second of which has its centre point earthed, and has its ends connected to two diodes respectively.

The output of the differential amplifier 23 feeds the amplifier 9 through a diode 26. At the output of the latter, the "purified video" is recovered at terminal B1.

The terminals 01, 03, 05, 07, 09 and 011 are connected to the first input of a differential amplifier 27 through respective resistances R1, R3, R5, R7, R9 and R11, and the terminals 02, 04, 06, 08, 010, 012 are connected to the second input of amplifier 27 through respective resistances R2, R6, R8, R10 and R12. For clarity, only references R1, R11 and R2, R12 appear on the drawing. A transformer and full-wave rectifier unit 28, identical with unit 25, is connected between the output S3 of the differential amplifier 27 and the input of the amplifier 10, the output of which is connected to the input of the potentiometer formed by a resistance R, the other terminal of which is earthed, and by a movable contact which forms the terminal B2 and is connected to the first input of the differential amplifier 29, the other input of which is connected to the terminal B1. The circuits following the latter are identical with those shown in FIGURE 1.

The resistances $r1$, $r2$, $r3$, $r4$ ensure the earthing of the different rectifier elements of the circuit.

FIGURE 7 shows the function obtained at the output S3 upon reception of a punctual target echo, for the algebraic sum $(01+03 \ldots +011)-(02+04+012)$, that is to say, referring to FIGURE 2, by taking, for example in the case of a delay line 2 without loss, $R1=R2=\ldots=R12$, and, as already mentioned, the echoes are suppressed except at the two ends of the line 2.

The residual echoes obtained at the ends of the delay line may be considerably reduced by effectuating, instead of the preceding constant coefficient signal sum of the signals 0 to 012, a weighted algebraic sum thereof, for example by assuming the summation gain to be equal to For the tappings:
| | |
|---|---|
| 06 and 07 | 1 |
| 01 and 012 | 0.17 |
| 02 and 011 | 0.34 |
| 03 and 010 | 0.5 |
| 04 and 09 | 0.67 |
| 05 and 08 | 0.83 |

The residue of the echoes then appears on all the line but with an amplitude divided by 6, that is to say, lower than the thermal noise level.

For this purpose, it is sufficient, still in the case of a line without loss, to give to the resistances R1 to R12 values inversely proportional to the weights assigned to the corresponding tappings 01 to 012, that is to say, in the case of the preceding example 0.17 R1=0.17 R12=0.34 R2=0.34 R11=0.5 R3=0.5
R10=0.67 R4=0.67 R9=0.83 R5=0.83 R8=R6=R7

In all the other cases, the resistances connected to the different tappings of the line will be selected, while taking into account in known manner the attenuation of the signal along the delay line.

Of course, the invention is not limited to the embodiment described and given merely by way of example of a circuit permitting realisation of the various arithmetic combinations according to the invention.

What is claimed, is:

1. A system for treating video signals of a pulse radar receiver having a video frequency output, said video signals comprising echo pulses of a duration $t$, non-desired echo pulses of a duration $t'$, different from $t$, and noise, said system comprising: a delay line coupled to said output, and introducing at said video frequency a total delay equal to $nt/2$, where $n$ is an integer greater than four, said line having $(n+1)$ output tappings, two of said tappings being terminal tappings and said tappings being spaced along said line for providing at said video frequency between any two successive tappings a delay equal to $t/2$; a multiple algebraic sum circuit having $(n+1)$ inputs, respectively coupled to said tappings, said circuit comprising first means for optimizing the amplitude of said useful pulses with respect to said nondesired pulses, said first means having a first output for providing a first signal, second means for providing a second signal having the same terminal portions as said first signal, said second means having a second output for providing said second signal, and third means for eliminating echo pulses from said video signals, said third means having a third output for providing a third signal; first subtracting means, coupled to said first and second outputs for subtracting said second signal from said first signal, said subtracting means having a fourth output; and second subtracting means coupled to said fourth and third outputs, said second subtracting means having an output providing treated video signals.

2. A system for treating video signals of a pulse radar receiver having a video frequency output, said video signals comprising echo pulses of a duration $t$, non-desired echo pulses of a duration $t'$, different from $t$, and noise, said system comprising: a delay line coupled to said output and introducing at said video frequency a total delay equal to $nt/2$, where $n$ is an integer greater than four, said line having $(n+1)$ successive output tappings respectively numbered 1 to $(n+1)$, the first and the $(n+1)^{th}$ ones of said tappings being terminal tappings and said tappings being spaced along said line for providing at said video frequency between any two successive tappings a delay equal to $t/2$; a multiple algebraic sum circuit having $(n+1)$ inputs, respectively numbered 1 to $(n+1)$, respectively coupled to said tappings and comprising first algebraic adding means for optimizing the amplitude of said useful pulses with respect to said non-desired pulses, said first means being coupled to $p$ successive ones of said inputs, where $p$ is an integer smaller than $n$ and greater than three, and having a first output for providing a first signal, second algebric adding means, for providing a second signal having the same terminal portions as said first signal, said second means being coupled to said $p$ inputs and having a second output for providing a second signal and third means, for eliminating echo pulses from said video signals, said third means being coupled to said $(n+1)$ inputs and having a third output for providing a third signal; first detecting means coupled to said first output and having a fourth output; first full-wave rectifying means coupled to said second output and having a fifth output; first subtracting means having two inputs respectively coupled to said fourth and fifth outputs, and a sixth output; second full-wave rectifying means coupled to said third output and having a seventh output; voltage control means having a control input coupled to said seventh output and an eighth output; second subtracting means having two inputs respectively coupled to said sixth and eighth outputs, and a ninth output; and limiting means, coupled to said ninth output and having a tenth output.

3. A system according to claim 2 wherein $n$ is an odd integer and $p$ is an even integer, the delay between the first tapping and the tapping coupled to the first of said $p$ inputs being equal to the delay between the tapping coupled to the last one of said $p$ successive inputs and the $(n+1)^{th}$ tapping.

4. A system according to claim 3 wherein $p$ is equal to four.

5. A system according to claim 4 wherein $n$ is equal to eleven.

6. A system for treating video signals of a pulse radar receiver having a video frequency output, said video signals comprising echo pulses of a duration $t$, non-desired echo pulses of a duration $t'$ different from $t$ and noise, said system comprising: a delay line coupled to said output and introducing at said video frequency a total delay equal to $nt/2$, where $n$ is an integer greater than four, said line having $(n+1)$ successive output tappings, respectively numbered 1 to $(n+1)$, the first and the $(n+1)^{th}$ ones of said tappings being terminal tappings and said tappings being spaced along said line for providing at said video frequency between any two successive tappings a delay equal to $t/2$; a multiple algebraic sum circuit having $(n+1)$ inputs, numbered 1 to $(n+1)$ respectively coupled to said tappings, said circuit comprising first algebraic adding means, for optimizing the amplitude of said useful pulses with respect to said non-desired pulses, said first means comprising $p$ first resistors, where $p$ is an integer greater than three and smaller than $n$, respectively coupled to $p$ successive ones of said inputs, and first subtracting means coupled to said $p$ first resistors, and having a first output for providing a first signal, second algebraic adding means, for providing a second signal having the same terminal portions as said first signal, said second means comprising $p$ second resistors coupled respectively to said $p$ inputs and second subtracting means coupled to said $p$ second resistors and having a second output for providing a second signal and third means, for eliminating echo pulses from said video signals, said third means comprising $s$ resistors, where $s$ is an integer greater than $p$, respectively coupled to $s$ of said inputs and third subtracting means coupled to said $s$ resistors and having a third output for providing a third signal; first detecting means coupled to said first output and having a fourth output; first full-wave rectifying means coupled to said second output and having a fifth output; a first subtractor having two inputs respectively coupled to said fourth and fifth outputs, and a sixth output; second full-wave rectifying means coupled to said third output and having a seventh output; threshold voltage control means having an input coupled to said seventh output, and an eighth output; a second subtractor having two inputs respectively coupled to said sixth and eighth outputs, and a ninth output; and limiting means, coupled to said ninth output and having a tenth output.

7. A system according to claim 6 where $s$ is equal to $(n+1)$.

8. A system according to claim 6 wherein all said $s$ resistors have the same magnitude.

9. A system according to claim 6 wherein all said $p$ first and $p$ second resistors have the same magnitude.

10. A system according to claim 7 wherein the value of said $s=(n+1)$ resistances is a function of their rank, the resistances coupled to the inputs of the circuit coupled to the terminals of the line having the highest value and the resistance coupled to inputs of the circuit coupled to the center tappings having the lowest value.

11. A system for treating video signals of a pulse radar receiver having a video frequency output, said video signals comprising echo pulses of a duration $t$, non-desired echo pulses of a duration $t'$ different from $t$ and noise, said system comprising: a delay line coupled to said output and introducing at said video frequency a total delay equal to $nt/2$, where $n$ is an integer greater than four, said line having $(n+1)$ successive output tappings respectively numbered 1 to $(n+1)$, the first and the $(n+1)^{th}$ ones of said tappings being terminal tappings and said tappings being spaced along said line for providing at said video frequency between any two successive tappings a delay equal to $t/2$; a multiple algebraic sum circuit having $(n+1)$ inputs, numbered 1 to $(n+1)$ respectively coupled to said tappings, said circuit comprising first algebraic adding means, for optimizing the amplitude of said useful pulses with respect to said non-desired pulses, said first means comprising $p$ first resistors, where $p$ is an integer greater than three and smaller than $n$, respectively coupled to $p$ successive ones of said inputs, and first subtracting means coupled to said $p$ first resistors, and having a first output for providing a first signal, second algebraic adding means, for providing a second signal having the same terminal portions as said first signal, said second means comprising $p$ second resistors coupled respectively to said $p$ inputs and second subtracting means coupled to said $p$ second resistors and having a second output for providing a second signal and third means, for eliminating echo pulses from said video signals, said third means comprising $(n+1)$ resistors respectively coupled to said $(n+1)$ inputs and third subtracting means having an input coupled to said ones of said $(n+1)$ resistors which are coupled to the inputs of said circuit of odd rank, another input coupled to the remaining ones of said $(n+1)$ resistors, and a third output for providing a third signal; first detecting means coupled to said first output and having a fourth output; first full-wave rectifying means coupled to said second output and having a fifth output; a first subtractor having two inputs respectively coupled to said fourth and fifth outputs, and a sixth output; second full-wave rectifying means coupled to said third output and having a seventh output; threshold voltage control means having an input coupled to said seventh output, and an eighth output; a second subtractor having two inputs respectively coupled to said sixth and eighth outputs, and a ninth output; and limiting means, coupled to said ninth output and having a tenth output.

12. A system for treating video signals of a pulse radar receiver having a video frequency output, said video signals comprising echo pulses of a duration $t$, non-desired echo pulses of a duration $t'$, different from $t$, and noise, said system comprising: a delay line coupled to said output introducing at said video frequency a total delay equal to $nt/2$, where $n=2q-1$, $q$ being an integer greater than two, said line having $(n+1)$ successive output tappings respectively numbered 1 to $(n+1)$, the first and the $(n+1)^{th}$ ones of said tappings being terminal tappings and said tappings being spaced along said line for providing at said video frequency between any two successive tappings a delay equal to $t/2$; a multiple algebraic sum circuit having $(n+1)$ inputs respectively numbered 1 to $(n+1)$, respectively coupled to said tappings, and comprising a first set of two resistors having respective first terminals coupled to the $q^{th}$ and $(q+1)^{th}$ inputs and respective second terminals, a second set of two resistors having respective first terminals coupled to the $(q-1)^{th}$ and $(q+2)^{th}$ inputs and respective second terminals, first subtracting means having one input coupled to both second terminals of said resistors of said first set, another input coupled to both second terminals of said resistors of said second set and a first output, a third set of two resistors having respective first terminals coupled to the $(q-1)^{th}$ and $(q+1)^{th}$ inputs and respective second terminals, a fourth set of two resistors having respective first terminals coupled to the $q^{th}$ and $(q+2)^{th}$ inputs and respective terminals, second subtracting means having an input coupled to both second terminals of said resistances of said third set, another input coupled to both second terminals of said resistances of said fourth set and a second output, a fifth set of $q$ resistors having respective first terminals respectively coupled to the inputs of odd rank and respective second terminals, a sixth set of $q$ resistors having respective first terminals respectively coupled to the inputs of even ranks and respective second terminals, and third subtracting means having an input coupled to the second terminals of all of said resistors of said fifth set, another input coupled to the second terminals of all of said resistors of said sixth set and a third output.

13. A system according to claim 12 further comprising fourth subtracting means coupled to said first and second outputs and having a fourth output, and fifth subtracting means coupled to said fourth and third outputs and having a fifth output providing treated video signals.

14. A system according to claim 12 wherein all resistors of said first, second, third and fourth sets are of a same magnitude.

15. A system according to claim 12, wherein all resistors coupled to a same input are of same magnitude.

16. A system according to claim 12, wherein all resistors of said fifth and sixth sets are of a same magnitude.

17. A system according to claim 12 where the resistors of said fifth and sixth sets are of different magnitude, the resistors coupled to the center inputs having the lowest value and these coupled to the first and $(n+1)^{th}$ inputs having the highest value.

18. A system according to claim 12 wherein $n$ is taken equal to five.

No references cited.

RODNEY D. BENNETT, *Primary Examiner.*

R. A. FARLEY, *Assistant Examiner.*